UNITED STATES PATENT OFFICE.

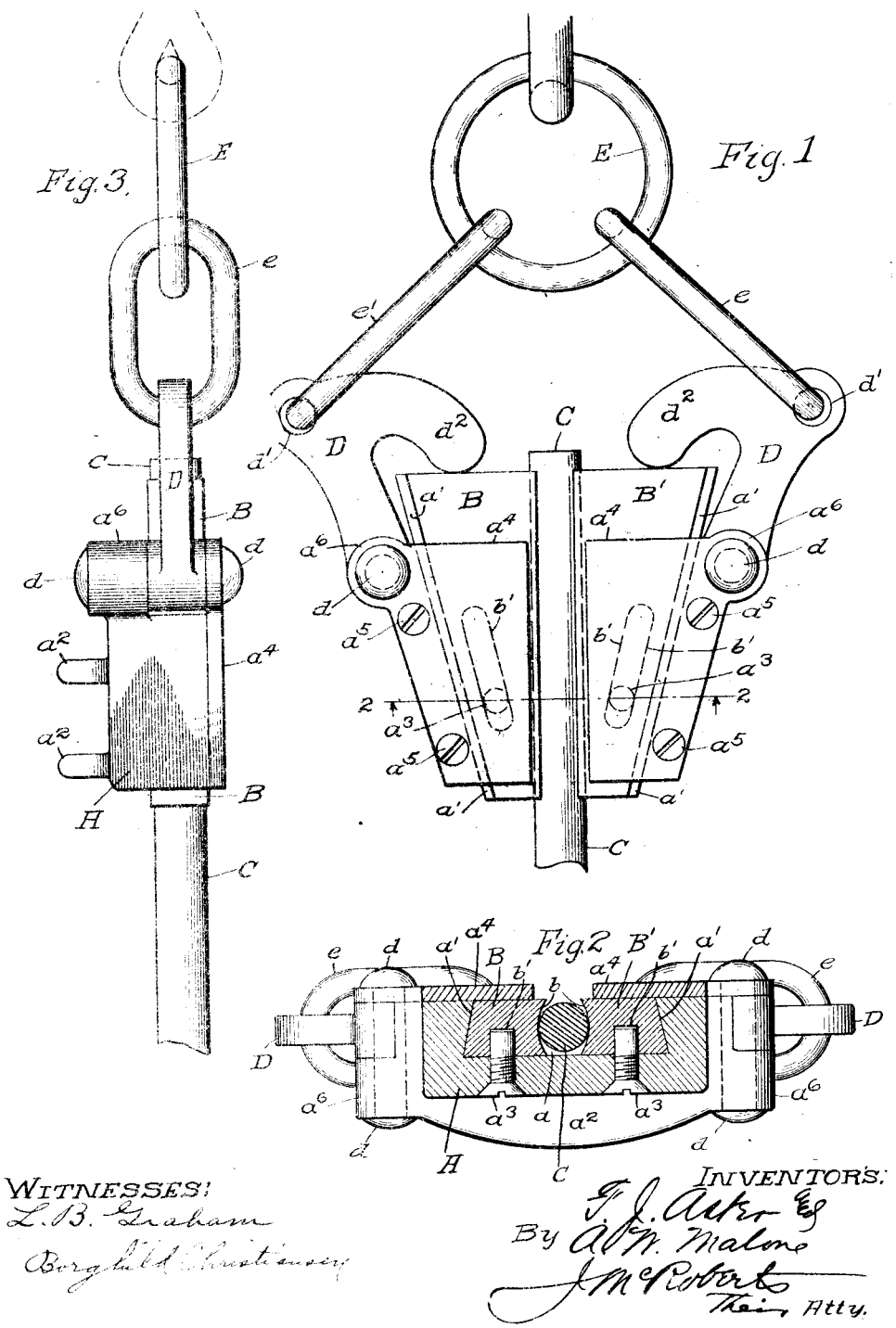

FREDERICK JOHN ASTER, OF ROCK ISLAND, ILLINOIS, AND ADOLPHUS WILLIAM MALONE, OF DAVENPORT, IOWA.

STRETCHER FOR CABLES, WIRES, &c.

1,048,928.   Specification of Letters Patent.   Patented Dec. 31, 1912.

Application filed August 24, 1912. Serial No. 716,817.

*To all whom it may concern:*

Be it known that we, FREDERICK J. ASTER and ADOLPHUS W. MALONE, citizens of the United States, residing, respectively, at Rock Island, county of Rock Island, State of Illinois, and Davenport, in the county of Scott and State of Iowa, have invented certain new and useful Improvements in Stretchers for Cables, Wires, &c., of which the following is a specification, reference being had therein to the accompanying drawing.

Our invention relates to stretchers for cables or wires and is particularly directed to the production of a device for this purpose which may be used with cables and wires of various sizes and provides greater holding power therefor according to the force applied to stretch the same, and which may be readily attached to and detached from the wires or cables and with perfect safety to the operator.

The invention consists in the matters hereinafter described, and then pointed out in the appended claims.

In the drawings which illustrate a practical embodiment of our invention Figure 1 is a top plan view of the stretcher or clamp with a wire in place between its jaws, and associated with a pulling ring; Fig. 2 is a transverse sectional view upon the line 2—2 of Fig. 1 looking in the direction of the arrows, and Fig. 3 is a side view of the parts shown in Fig. 1.

In the drawings the reference letter A indicates a base of suitable metal which is somewhat fan shaped or slightly larger at one end than the other and is provided upon one of its faces with a channel $a$ which is wedge shaped in cross section or gradually reduced in width toward one end and whose sides $a'$ are under cut as clearly shown in Fig. 2. The opposite face of the base is provided with transverse strengthening ribs $a^2$.

In the channel $a$ are located two wedge shaped metallic jaws B and B' which are inclined upon their outer sides to correspond with the under cut sides of the channel, and are spaced apart to receive the wire or cable C to be acted upon; the gripping sides of the jaws are rounded or curved to increase the gripping surfaces of the jaws upon the cable or wire. The jaws are held in place by means of removable pins or screws $a^3$ passing through the body of the base and projecting into the channel to engage diverging grooves or slots $b'$ cut in the lower portions of the wedges parallel with the inclination or bevel of the sides of the jaws, and top plates $a^4$ are fastened to the upper face of the base by suitable screws $a^5$ and extend inwardly toward the center of the base to overlie the wedges but leave a passage or channel for the insertion and removal of the wire or cable.

The base is provided at each corner of its widest end with an ear $a^6$, and in each of the ears an angular metallic hook D is pivoted as at $d$, each of the hooks being provided in its apex or angle with an opening $d'$ and with an oppositely projecting lateral end $d^2$, the ends projecting inwardly toward each other and lying in the planes of the jaws in such relation that the end $d^2$ of each hook will press against the projecting enlarged end of one of the jaws to crowd or cam the jaws down into the channel of the base as the hooks are drawn inwardly toward each other on their pivots. The hooks are connected to a ring or other suitable connecting piece E by means of the links $e$ engaging the openings of the hooks and connected to the ring, the arrangement of the parts being such that when stress or force is applied to the ring in a direction away from the base the ends of the hooks will be forced down upon the tops of the jaws and cause the latter to move down into the channel and thereby close upon and grip the wire or cable. It is evident that by this construction and arrangement of parts the jaws will have an increased grip or holding power upon the cable or wire according to the increase of the strain or force applied to the ring when drawn away from the base.

By removing the screws or pins $a^3$ the jaws can be removed from the base for the purpose of interchanging them with others of different size in order to accommodate wires or cables of different diameters.

In the use of the invention the end of a wire or cable may be slipped into position between the jaws when the latter are somewhat opened up or an intermediate portion of a length of cable or wire may be inserted by loosening the jaws and passing the cable into position between the jaws through the opening between the top plates, and in either event when force or strain is applied to the ring E as above described the hooks will force the jaws to position to grip the cable or wire as shown in Fig. 1, which may then be stretched by continued strain or force upon the pulling ring, the increase of the strain upon the ring increasing the grip of the jaws upon the cable. When the wire or cable is properly stretched the action of the jaws thereon is relaxed by relieving the strain or force upon the pulling ring E which in turn releases the strain upon the hooks and their pressure upon the jaws so that the latter may be easily released from their grip upon the wire or cable by slightly moving the base along the cable toward its reduced end.

Various changes in form and size of the parts may be made without departing from the scope of our invention.

We claim:

1. In a device of the class described, a base having a beveled channel, an opposite pair of wedge shaped jaws in the channel spaced a suitable distance apart to receive a wire or cable between their adjacent faces, means to retain the jaws in the channel, hooks pivoted on the base and adapted to bear on the enlarged ends of the jaws, and means to move the hooks on their pivots to force the jaws into the channel.

2. In a device of the class described, a base having a beveled channel provided with opposite undercut sides, an opposite pair of wedge shaped jaws each having an inclined side to fit one of the undercut sides of the channel, screws passing through the base into the channel and entering slots in the jaws, the jaws being spaced apart at their opposite sides to receive a cable or wire, plates on the base overlying the jaws and providing an opening for the wire or cable, hooks pivoted to the base and having lateral ends bearing on the enlarged ends of the jaws, and a pulling device attached to the outer ends of the hooks.

In testimony whereof we affix our signatures in presence of two witnesses.

FREDERICK JOHN ASTER.
ADOLPHUS WILLIAM MALONE.

Witnesses:
ROBT. O. YOUNG,
SAM RYERSON.